(12) United States Patent  
Kaneko

(10) Patent No.: US 11,950,012 B2  
(45) Date of Patent: Apr. 2, 2024

(54) APPARATUS, METHOD OF CONTROLLING THE SAME, AND STORAGE MEDIUM

(71) Applicant: CANON KABUSHIKI KAISHA, Tokyo (JP)

(72) Inventor: Seigo Kaneko, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/932,207

(22) Filed: Sep. 14, 2022

(65) Prior Publication Data

US 2023/0090876 A1 Mar. 23, 2023

(30) Foreign Application Priority Data

Sep. 17, 2021 (JP) ................................. 2021-152318

(51) Int. Cl.
*H04N 5/262* (2006.01)
*G06V 10/22* (2022.01)
*G06V 40/10* (2022.01)
*H04N 23/72* (2023.01)
*H04N 23/741* (2023.01)

(52) U.S. Cl.
CPC ........... *H04N 5/2628* (2013.01); *G06V 10/22* (2022.01); *G06V 40/10* (2022.01); *H04N 23/72* (2023.01); *H04N 23/741* (2023.01)

(58) Field of Classification Search
CPC .... H04N 5/2628; H04N 23/72; H04N 23/741; H04N 23/69; H04N 23/695; H04N 25/51; H04N 23/73; H04N 23/76; H04N 25/533; H04N 25/535; G06V 10/22; G06V 40/10

See application file for complete search history.

(56) References Cited

U.S. PATENT DOCUMENTS

| | | | | |
|---|---|---|---|---|
| 2002/0191866 A1* | 12/2002 | Tanabe | ................. | G06T 3/4007 |
| | | | | 382/298 |
| 2014/0171796 A1* | 6/2014 | Kimoto | ................. | A61B 6/563 |
| | | | | 600/436 |
| 2015/0244916 A1 | 8/2015 | Kang | | |

FOREIGN PATENT DOCUMENTS

| EP | 3 007 434 A1 | 4/2016 |
|---|---|---|
| JP | 2019121815 A | 7/2019 |

* cited by examiner

*Primary Examiner* — Mekonnen D Dagnew
(74) *Attorney, Agent, or Firm* — CANON U.S.A., INC. IP Division

(57) ABSTRACT

An apparatus including a sensor for setting an exposure time or gain for each of pixel groups including at least one pixel includes an imaging unit including the sensor configured to capture a subject through an optical system to generate an image, an acquisition unit configured to acquire information about a specific image region in the generated image, a determination unit configured to determine a specific pixel region including at least one pixel group in the sensor and corresponding to the specific image region, based on the information about the specific image region, a change unit configured to change at least one of a number, a size, and a shape of pixel groups in the specific pixel region determined by the determination unit, and a control unit configured to control the exposure time or gain for each of the pixel groups.

18 Claims, 15 Drawing Sheets

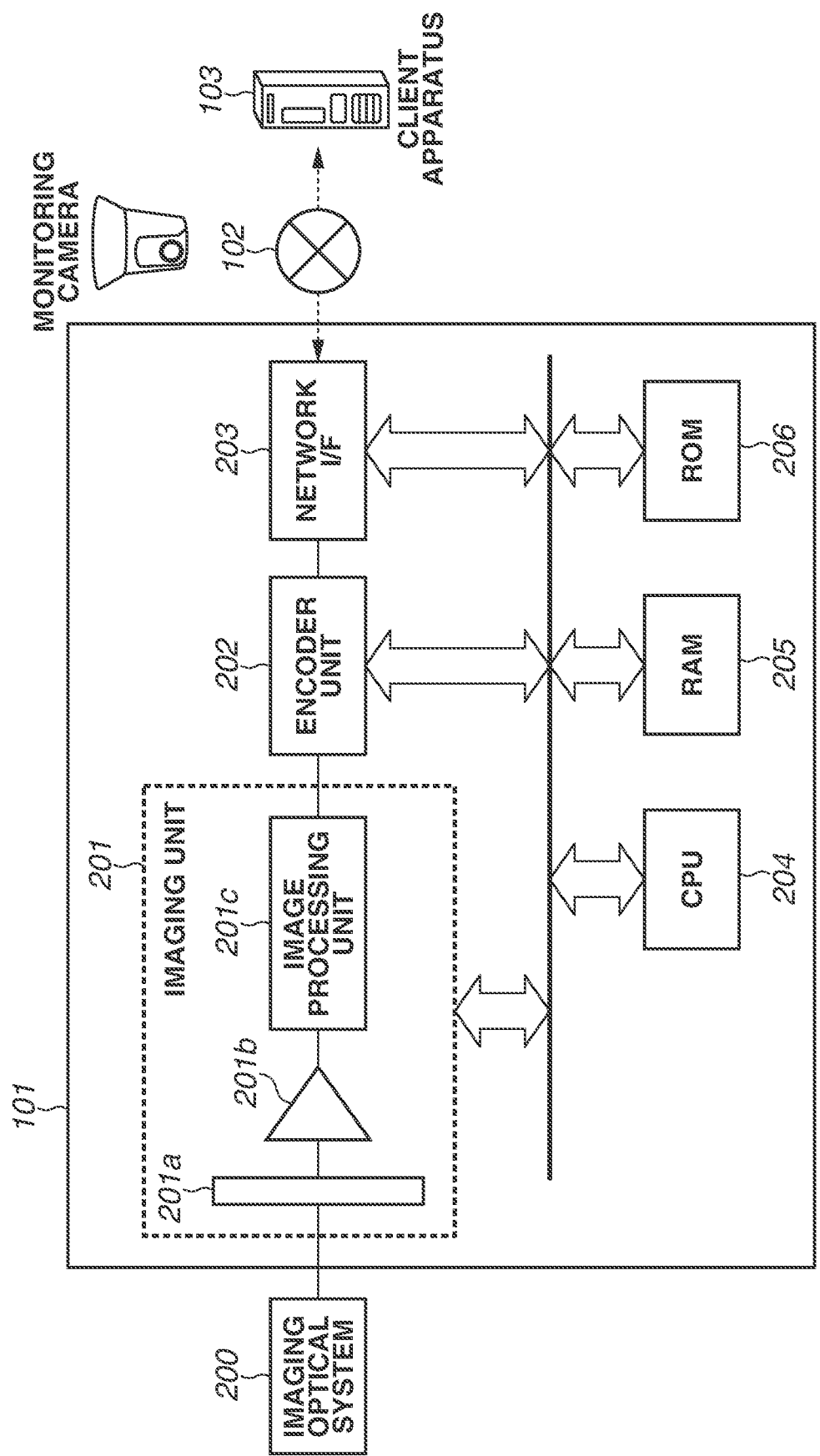

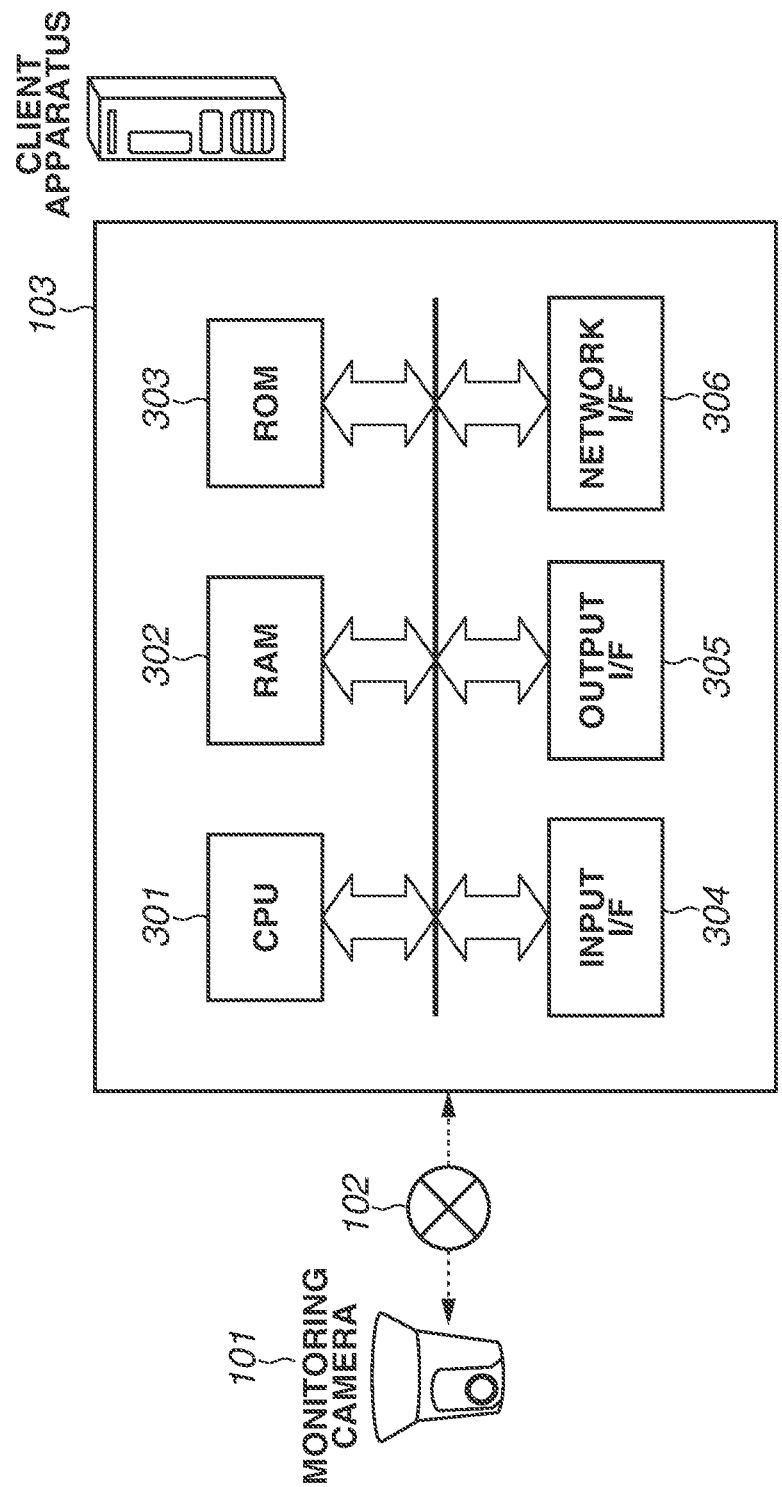

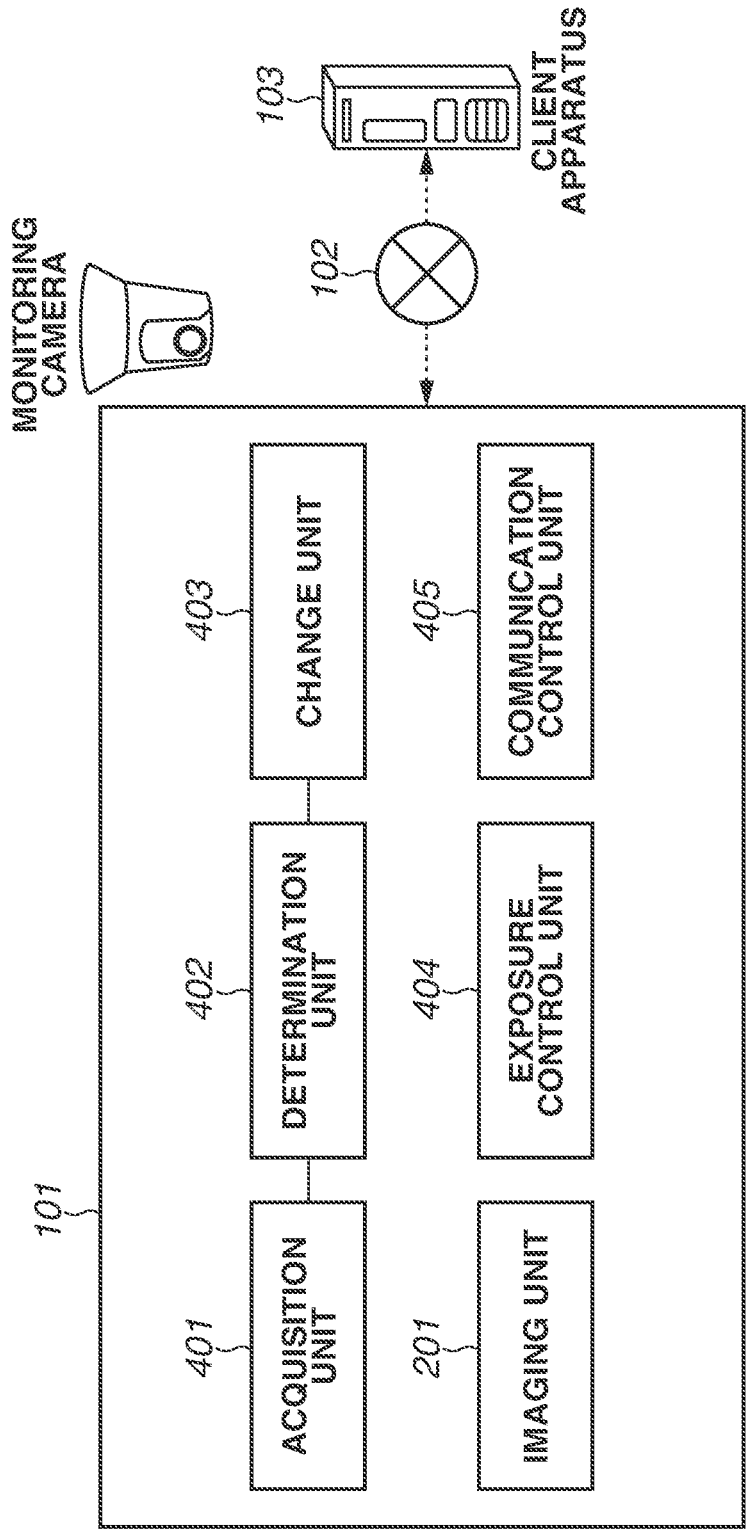

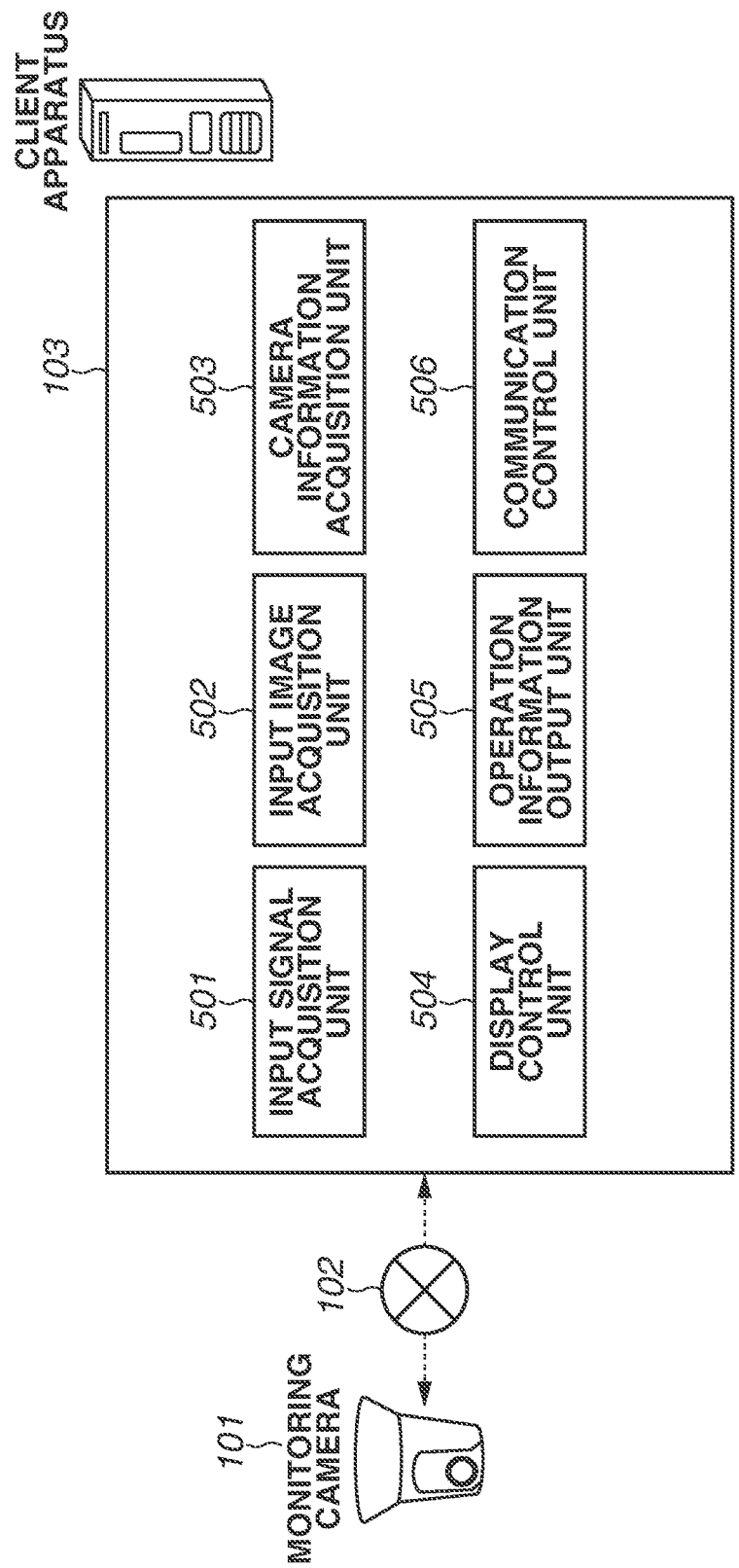

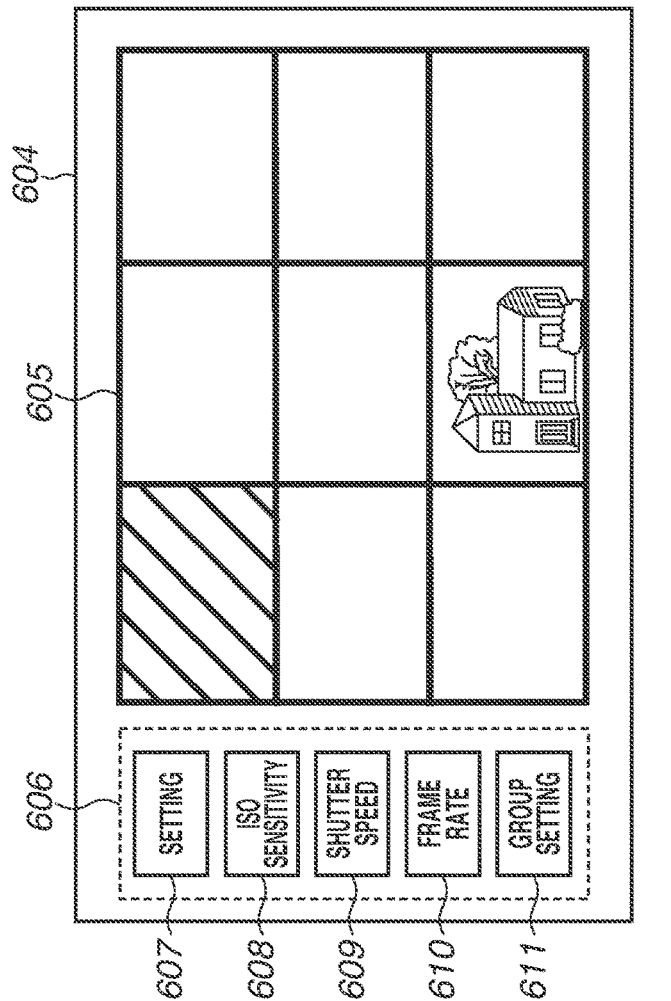
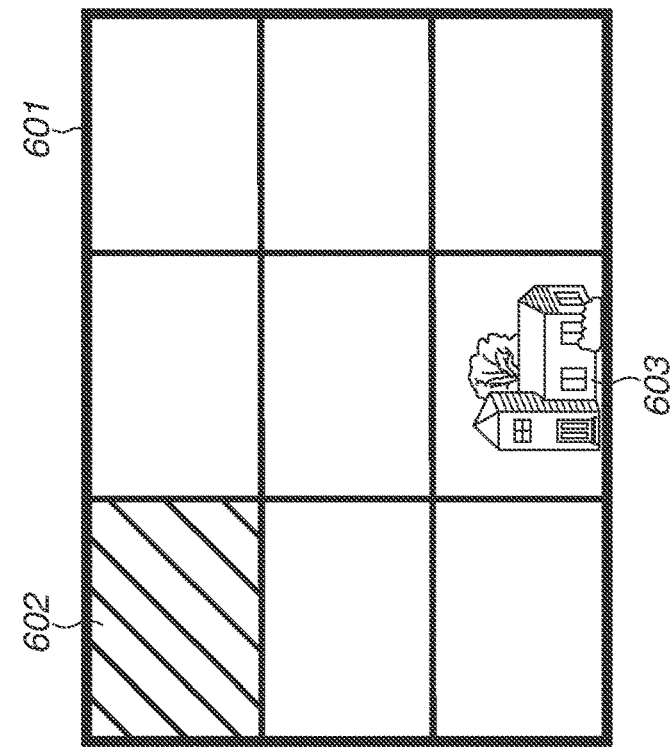

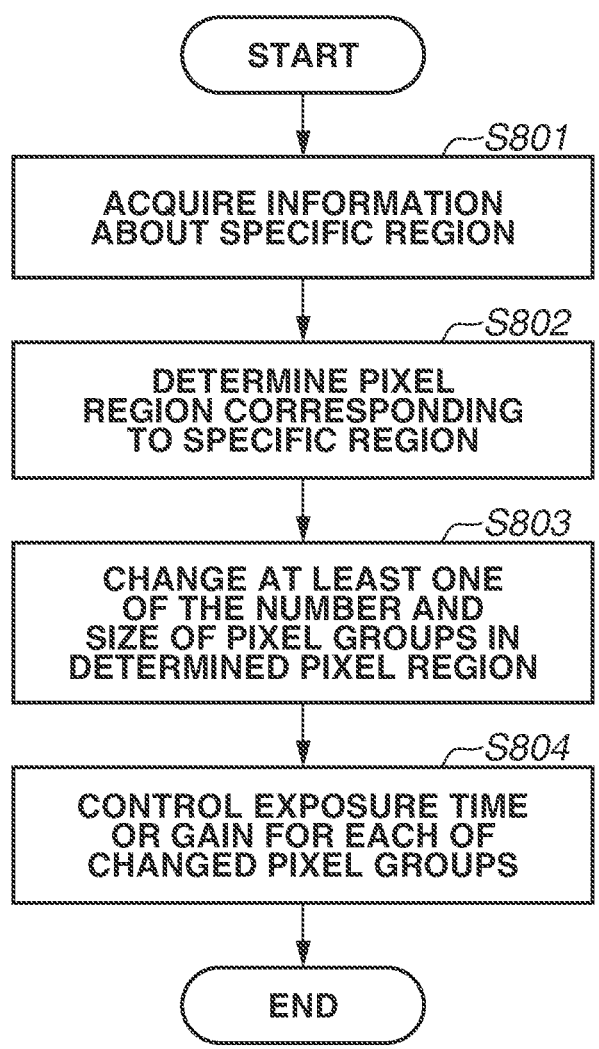

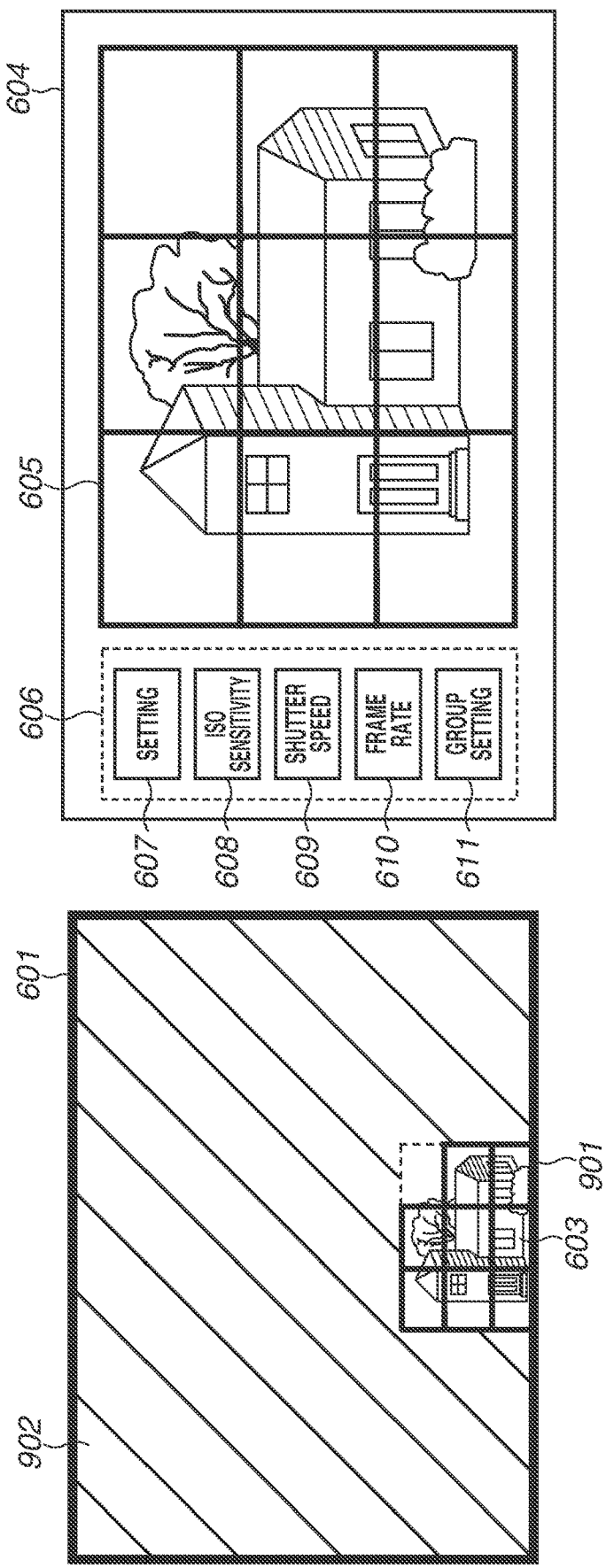

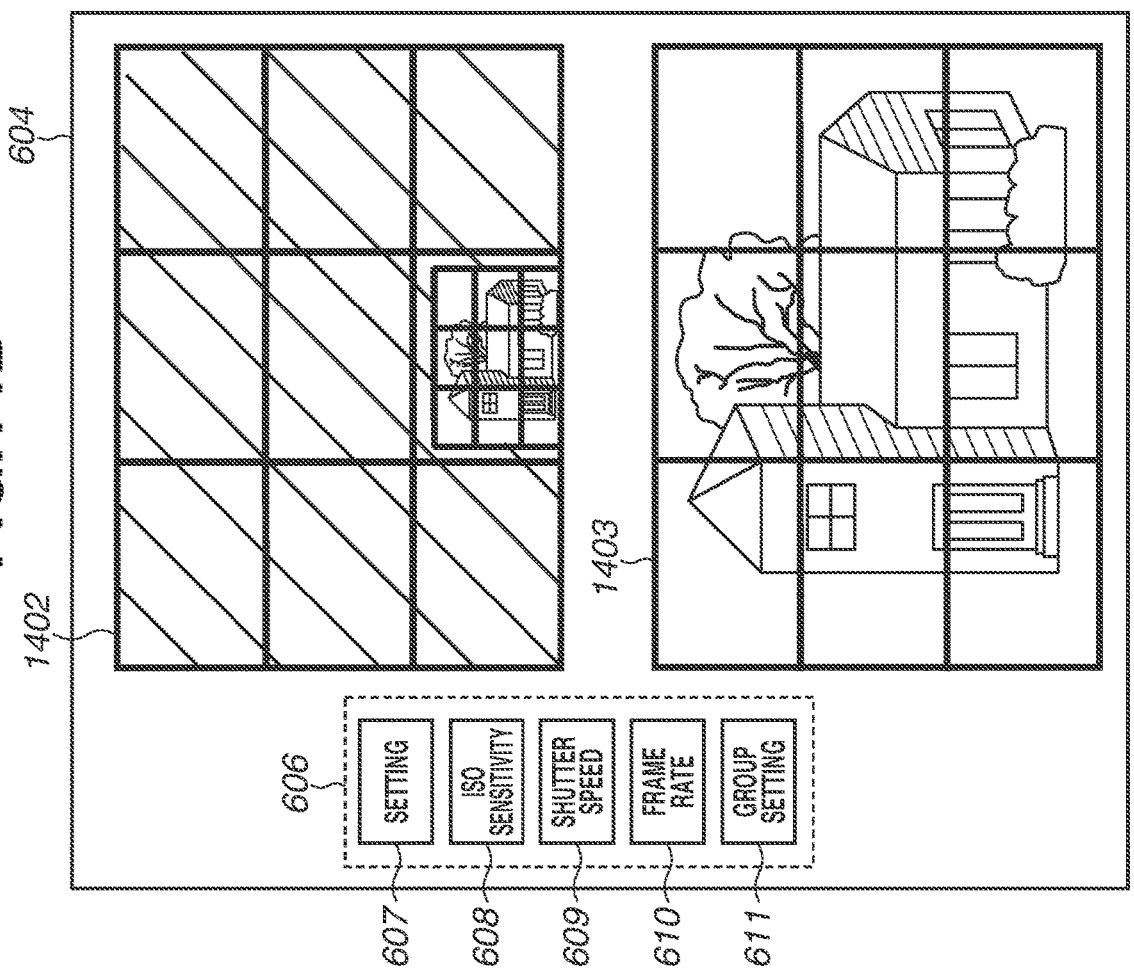
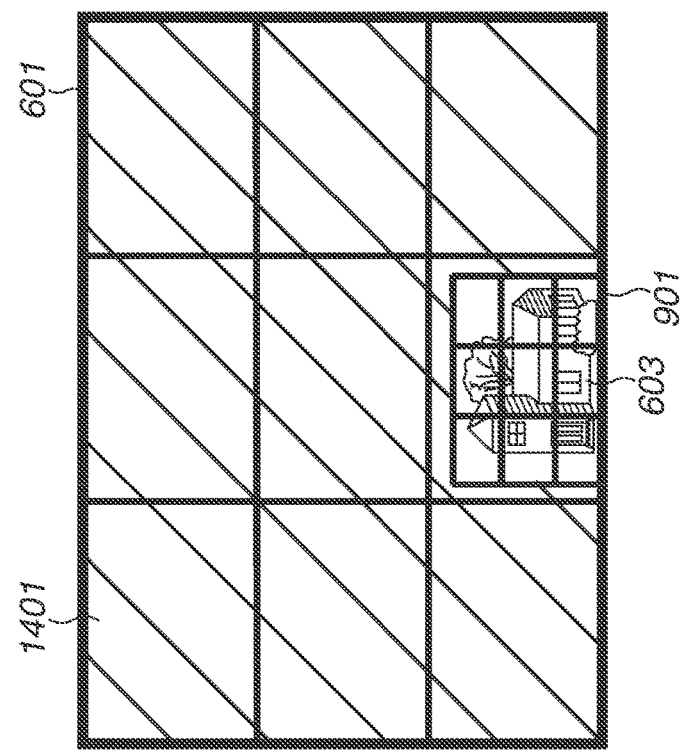

APPARATUS, METHOD OF CONTROLLING THE SAME, AND STORAGE MEDIUM

BACKGROUND

Technical Field

The aspect of the embodiments relates to an apparatus, a method of controlling the apparatus, and a storage medium.

Description of the Related Art

A conventional technique is known to generate a captured image suitable for displaying by controlling imaging conditions based on information about a display unit, such as an electronic viewfinder and a live view monitor. Japanese Patent Application Laid-Open No. 2019-121815 discusses a technique for changing exposure conditions based on information about the resolution, refresh rate, and contrast ratio of a display unit.

SUMMARY

According to an aspect of the embodiments, an apparatus including a sensor for setting an exposure time or gain for each of pixel groups including at least one pixel includes an imaging unit including the sensor and configured to capture a subject through an optical system to generate an image, an acquisition unit configured to acquire information about a specific image region in the generated image, a determination unit configured to determine a specific pixel region including at least one pixel group in the sensor and corresponding to the specific image region, based on the information about the specific image region, a change unit configured to change at least one of a number, a size, and a shape of pixel groups in the determined specific pixel region, and a control unit configured to control the exposure time or gain for each of the pixel groups.

Further features of the disclosure will become apparent from the following description of exemplary embodiments with reference to the attached drawings.

BRIEF DESCRIPTION OF THE DRAWINGS

FIG. 2 illustrates an example of an apparatus configuration of an imaging apparatus according to the first exemplary embodiment.

FIG. 3 illustrates an example of an apparatus configuration of an information processing apparatus according to the first exemplary embodiment.

FIG. 4 illustrates an example of a functional configuration of the imaging apparatus according to the first exemplary embodiment.

FIG. 5 illustrates an example of a functional configuration of the information processing apparatus according to the first exemplary embodiment.

FIGS. 6A and 6B illustrate an example of an image captured by the imaging apparatus and an example of a display screen of a display apparatus (input apparatus) according to the first exemplary embodiment.

FIG. 8 illustrates an example of an operation of the imaging apparatus according to the first exemplary embodiment.

FIGS. 11A and 11B illustrate an example of a combination of pixel groups corresponding to a display region and a non-display region in the imaging apparatus according to the first exemplary embodiment.

FIGS. 14A and 14B illustrate example changes of the number, the size, and the shape of pixel groups when a plurality of images is displayed on the imaging apparatus according to the first exemplary embodiment.

DESCRIPTION OF THE EMBODIMENTS

Exemplary embodiments for embodying the disclosure will be described in detail below with reference to the attached drawings. The following exemplary embodiments are to be considered as illustrative for achieving the disclosure, and may be suitably corrected or modified depending on the configuration of an apparatus according to the disclosure and other various conditions. The disclosure is not limited to the following exemplary embodiments. In addition, parts of the following exemplary embodiments may be suitably combined.

(System Configuration)

Figure 1:
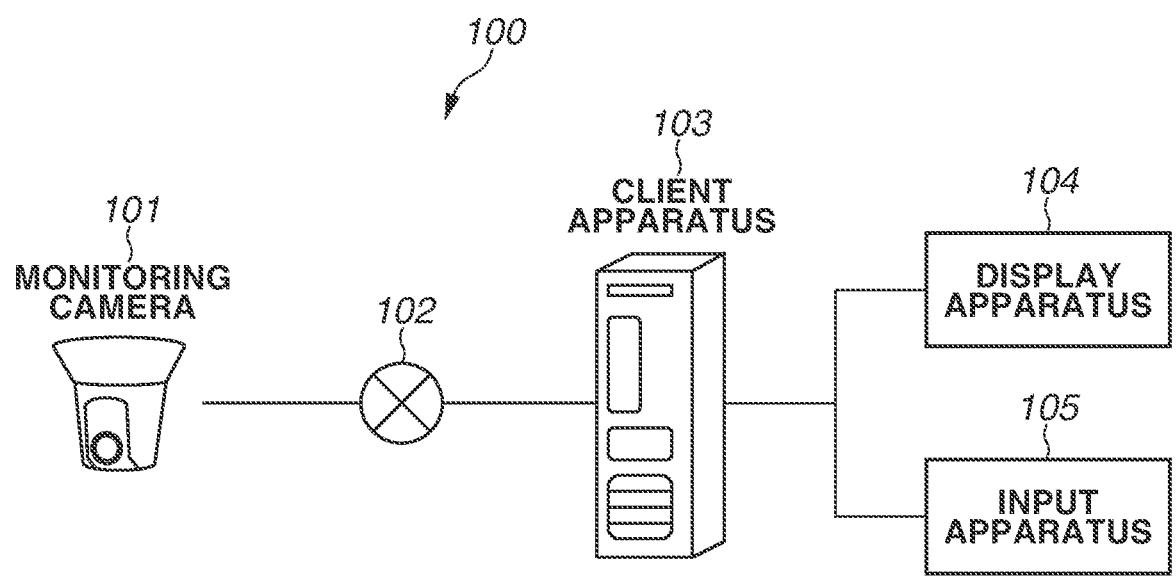
FIG. 1 illustrates an example of a system configuration according to a first exemplary embodiment.

FIG. 1 illustrates an example of a configuration of an imaging system including an imaging apparatus according to a first exemplary embodiment. An imaging system 100 includes a monitoring camera 101, a network 102, a client apparatus 103, a display apparatus (display unit) 104, and an input apparatus (input unit) 105.

The monitoring camera 101 can communicate with the client apparatus 103 via the network 102. The monitoring camera 101 captures a subject to generate an image and transmits the captured image to the client apparatus 103 via the network 102. The client apparatus 103 is connected with the display apparatus 104 and the input apparatus 105. The image transmitted from the monitoring camera 101 is displayed on the display apparatus 104. The input apparatus 105 is, for example, a keyboard or a mouse, and is used to operate the client apparatus 103. Operations on the client apparatus 103 include settings of imaging conditions and Pan Tilt Zoom (PTZ) operations for the monitoring camera 101 via the network 102.

According to the present exemplary embodiment, the client apparatus 103, the display apparatus 104, and the input apparatus 105 are separate units. However, the client apparatus 103, the display apparatus 104, and the input apparatus 105 may be configured to be a single unit, such as a notebook personal computer (PC) having a touch panel display. The monitoring camera 101 and the client apparatus 103 do not necessarily need to be connected via the network 102 but may be directly connected with each other. Further, the camera (monitoring camera 101), the client apparatus 103, the display apparatus 104, and the input apparatus 105 may be configured to be a single unit, such as a consumer camera having a touch panel display.

(Apparatus Configuration)

FIG. 2 illustrates an example of a configuration of the imaging apparatus according to the present exemplary embodiment. The monitoring camera 101 includes an imaging unit 201, an encoder unit 202, a network interface (I/F) 203, a central processing unit (CPU) 204, a random access memory (RAM) 205, and a read only memory (ROM) 206. An imaging optical system 200 is attachable to and detachable from the monitoring camera 101.

The imaging optical system 200 includes, for example, a lens to focus light from a subject, on the imaging plane of an image sensor 201a (described below). The imaging optical system 200 includes, for example, a zoom lens, a focus lens, and a shake correction lens.

In the present exemplary embodiment, the imaging optical system 200 is attachable to and detachable from the monitoring camera 101 as a separate unit. However, the monitoring camera 101 may include the imaging optical system 200 like a lens-integrated camera.

The imaging unit 201 captures an image of a subject with the imaging optical system 200 to generate an image. The imaging unit 201 includes the image sensor 201a, an amplifier 201b, and an image processing unit 201c.

The image sensor 201a converts light from the subject focused on the imaging plane by the imaging optical system 200 into an electrical signal, and outputs the electrical signal for each pixel. The image sensor 201a can set and change the exposure time (charge accumulation time) for each pixel or each pixel group on the imaging plane. An image sensor 201a is an integrated circuit (IC) chip in which pixels each including a photoelectric conversion element, such as a charge coupled device (CCD) sensor and a complementary metal oxide semiconductor (CMOS) sensor, are arranged in a matrix form. The image sensor 201a has high sensitivity mainly to visible light (either one of red (R), green (G), and blue (B) for each pixel) and has some sensitivity to infrared radiation. The image sensor 201a is therefore capable of photographically capturing an image of a bright subject irradiated with infrared radiation at a location lit by an infrared illumination, or in a time zone with sunlight in a vivid way.

The amplifier 201b amplifies the electrical signal output from the image sensor 201a and outputs an amplified signal. The amplifier 201b is provided for each pixel, and the signal gain (analog gain) of the amplifier 201b can be set and changed for each pixel or pixel group of the image sensor 201a.

The image processing unit 201c converts an analog electrical signal output from the amplifier 201b into a digital signal (analog-to-digital (A/D) conversion), and subjects the digital signal to image processing, such as demosaicing processing, white balance processing, and gamma processing, to generate a digital image. The image processing unit 201c amplifies or attenuates, for each pixel or pixel group, the digital value of the image signal output from each pixel or pixel group to correct the brightness of the image signal.

The encoder unit 202 subjects the image data output from the imaging unit 201 (image processing unit 201c) to encoding processing into a predetermined file format, such as Motion Jpeg, H264, and H265.

The network I/F 203 transmits to the client apparatus 103 the image data having been subjected to the encoding processing by the encoder unit 202 via the network 102. The image data having been subjected to the encoding processing may be stored in internal storage devices, such as the RAM 205 and the ROM 206 (described below), or in a removable storage medium (not illustrated), such as a Secure Digital (SD) card. These storage operations may be performed after the image processing unit 201c outputs the image data. In such a case, RAW data before being subjected to the encoding processing is stored as the image data.

The CPU 204 is a central processing unit that totally controls the monitoring camera 101.

The RAM 205 temporarily stores a computer program to be executed by the CPU 204. The RAM 205 provides a work area used by the CPU 204 to perform processing.

The RAM 205 functions as a frame memory or as a buffer memory.

The ROM 206 stores, for example, a program to be executed by the CPU 204 to control the monitoring camera 101.

FIG. 3 illustrates an example of a configuration of the client apparatus 103 connected with the imaging apparatus according to the present exemplary embodiment via the Internet. The client apparatus 103 is an information processing apparatus including a CPU 301, a RAM 302, a ROM 303, an input I/F 304, an output I/F 305, and a network I/F 306.

The CPU 301 is a central processing unit that totally controls the client apparatus 103.

The RAM 302 stores, for example, a program to be executed by the CPU 301 to control the client apparatus 103.

The ROM 303 stores, for example, a program to be executed by the CPU 301 to control the client apparatus 103.

The input I/F 304 is an interface that connects with the input apparatus 105 to accept an operation on the client apparatus 103 input by the user via the input apparatus 105.

An output I/F 305 is an interface that connects with the display apparatus 104 to display the image output from the monitoring camera 101 on the display apparatus 104.

A network I/F 306 is an interface that connects with the monitoring camera 101 via the network 102 to input operation information for the monitoring camera 101 and accept the image output from the monitoring camera 101.

(Function Configuration)

FIG. 4 illustrates an example of a functional configuration of the imaging apparatus according to the present exemplary embodiment. As to functions implemented by software out of the functional blocks illustrated in FIG. 4, programs that provide functional blocks are stored in a memory such as the ROM 206. The function of each functional block is implemented when a program is loaded into the RAM 205 and the CPU 204 executes the program. As to functions implemented by hardware, for example, a dedicated circuit is automatically generated on a field programmable gate array (FPGA) based on a program for implementing the function of each functional block by using a predetermined compiler. Similarly to the FPGA, a gate array circuit may be formed so that the function is implemented as hardware. The function may be implemented by an application specific integrated circuit (ASIC). The configuration of the functional block illustrated in FIG. 1 is to be considered as illustrative. One functional block may be formed of a plurality of functional blocks, or any one functional block may be divided into a plurality of functioning blocks.

The monitoring camera 101 includes an acquisition unit 401, a determination unit 402, a change unit 403, an exposure control unit 404, and a communication control unit 405.

The acquisition unit 401 acquires the image data captured by the imaging unit 201 and operation information input from the client apparatus 103 via the network 102. The operation information input from the client apparatus 103 refers to information about, for example, PTZ operations for the monitoring camera 101 and operations for setting the exposure time and the gain for each pixel or pixel group on the imaging unit 201. Upon reception of an input of an image captured by the monitoring camera 101, the client apparatus 103 displays the image on the display apparatus 104. The whole or a part of the image captured by the monitoring camera 101 is displayed on the display apparatus 104. The client apparatus 103 outputs, to the monitoring camera 101, information about the display region of the image captured by the monitoring camera 101 to be displayed on the display apparatus 104. The acquisition unit 401 acquires the information about the display region output from the client apparatus 103, as operation information.

The determination unit 402 determines the region of pixels (also referred to as a pixel region) of the imaging unit 201 (image sensor 201a) based on the operation information acquired by the acquisition unit 401. More specifically, the determination unit 402 determines the pixel region corresponding to the information about the display region acquired by the acquisition unit 401. In other words, the determination unit 402 determines the pixel region of the imaging unit 201 that is currently capturing (or will capture) the display region.

The change unit 403 changes at least one of the number and the size of pixel groups in the pixel region determined by the determination unit 402. More specifically, the change unit 403 changes these values based on user operation information and display region information acquired by the acquisition unit 401. The change unit 403 may change the values based on the number of pixel groups in the display region before the change. For example, if there are nine pixel groups for the display region before the change, the change unit 403 changes the values to maintain the number of pixel groups for the display region. The change unit 403 may change not only the number and the size of pixel groups but also the shape of pixel groups. For example, pixel groups may be set to a shape according to the main subject. The present exemplary embodiment will be described below centering on a case of changing the number, the size, and the shape of pixel groups already set in the pixel region determined by the determination unit 402. The change unit 403 also serves as a setting unit for setting the number, the size, and the shape of pixel groups on the imaging plane of the imaging unit 201.

The exposure control unit 404 determines and controls the exposure time or gain for each pixel group set on the imaging plane of the imaging unit 201. For example, the exposure control unit 404 determines and controls the exposure time or gain such that the average luminance value of images for each pixel group becomes the median of outputable data gradations.

Functions of the monitoring camera 101 may be configured as functions of the client apparatus 103.

FIG. 5 illustrates an example of a functional configuration of the client apparatus 103 connected with the imaging apparatus according to the present exemplary embodiment via the Internet. As to functions implemented by software out of the functional blocks illustrated in FIG. 5, programs that provide functional blocks are stored in a memory such as the ROM 303. The function of each functional block is implemented when the CPU 301 loads the corresponding program into the RAM 302 and executes the program. As to functions implemented by hardware, for example, a dedicated circuit is automatically generated on a FPGA based on a program for implementing the function of each functional block by using a predetermined compiler. Similarly to the FPGA, a gate array circuit may be formed so that the function is implemented as hardware. The function may be implemented by an ASIC. The configuration of the functional blocks illustrated in FIG. 5 is to be considered as illustrative. One functional block may be formed of a plurality of functional blocks, or any one functional block may be divided into a plurality of functioning blocks.

The client apparatus 103 includes an input signal acquisition unit 501, an input image acquisition unit 502, a camera information acquisition unit 503, a display control unit 504, an operation information output unit 505, and a communication control unit 506.

The input signal acquisition unit 501 accepts an input from the user via the input apparatus 105.

The input image acquisition unit 502 acquires the image received from the monitoring camera 101 via the network 102 as an input image.

The camera information acquisition unit 503 acquires camera information to be used when the monitoring camera 101 captures a subject via the network 102. The camera information refers to various types of camera setting information and image processing information to be used when the monitoring camera 101 captures a subject to acquire an image. More specifically, the camera information includes exposure parameters (camera setting information about exposure), such as the diaphragm, shutter speed, and gain, and information about luminance-related image processing, such as gamma correction, edge enhancement, and white balance. The camera information also includes the PTZ coordinates of the monitoring camera 101.

The display control unit 504 outputs the image captured by the monitoring camera 101 to the display apparatus 104 according to an instruction from the CPU 301. The image to be output to the display apparatus 104 is the whole or a part of the image captured by the monitoring camera 101. For example, when the input signal acquisition unit 501 acquires an electronic zoom instruction or a Picture in Picture (PinP) instruction from the user, the display control unit 504 subjects the image acquired by the input image acquisition unit 502 to electronic zoom processing or trimming processing and outputs the processed image to the display apparatus 104.

The operation information output unit 505 outputs an operation on the monitoring camera 101 from the user acquired by the input signal acquisition unit 501. For example, the operation information output unit 505 outputs PTZ operations on the monitoring camera 101 and the electronic zoom position or trimming region controlled by the display control unit 504, to the monitoring camera 101 via the network 102. More specifically, the operation information output unit 505 outputs PTZ control values and positional information indicating the region subjected to electronic zooming (trimming).

The communication control unit 506 totally controls the transmission and reception between the monitoring camera 101 and the client apparatus 103 via the network 102.

The monitoring camera 101 may include the display control unit 504. In such a case, the electronic zoom processing (trimming processing) is performed by the image processing unit 201c of the monitoring camera 101, and the image after the electronic zooming is transmitted to the client apparatus 103 via the network 102. In a case where the client apparatus 103 and the monitoring camera 101 are configured as a single unit (e.g., a consumer camera), the functional configuration of the unit includes the functions of the monitoring camera 101 and the whole or a part of the functions of the client apparatus 103.

(Operations)

Operations of the imaging apparatus according to the present exemplary embodiment will now be described with reference to FIGS. 6A, 6B, 7, 8, 9A, 9B, 10A, and 10B.

FIGS. 6A and 6B illustrate an image captured by the imaging unit 201 and an image output to the display apparatus 104. Referring to FIG. 6A, the imaging region 601 indicates an example of an image region captured with the number of effective pixels of the imaging unit 201 (image sensor 201a). The grid lines illustrated in FIG. 6A represent the correspondence between pixel groups in the imaging region 601 and pixel groups on the imaging plane of the imaging unit 201. FIG. 6A illustrates a state where the imaging region 601 is divided into nine different pixel groups. A pixel group 602 as the shaded region is one of the nine pixel groups.

A subject 603 is captured as a one pixel group by the imaging unit 201 in a state where all pixels in the pixel group including the subject 603 are controlled based on the same exposure time or gain by the exposure control unit 404.

FIG. 6B illustrates an example of a display screen of the image transmitted to the client apparatus 103 via the network 102 and then output to the display apparatus 104. A display screen 604 is provided with an image display region 605 and an operation button display region 606. The image display region 605 is a region for displaying the image captured by the imaging unit 201, i.e., a static image, a moving image, and a live view image. According to the present exemplary embodiment, the image display region 605 and the operation button display region 606 are provided in one display screen 604. The grid lines drawn in the image display region 605 indicate nine pixel groups similarly to FIG. 6A. The present exemplary embodiment will be described below on the premise that the input apparatus 105 and the display apparatus 104 are configured as a single unit. Thus, the display screen 604 is a touch panel display that enables the user to select each pixel group with a touch operation or a drag operation. If the input apparatus 105 and the display apparatus 104 are configured as separate units, the user can select each pixel group with a click (touch) or a drag operation on the input apparatus 105, such as a mouse, a keyboard, and a touch pad.

The imaging conditions including the exposure time and the gain of the pixel group selected by the user can be set by touching (clicking) a Setting button 607 displayed in the operation button display region 606. Operation buttons include an International Organization for Standardization (ISO) Sensitivity button 608 (also referred to as a gain button), a Shutter Speed button 609 (also referred to as an exposure time button), a Frame Rate button 610, and a Group Setting button 611. For example, when the user touches (clicks) a pixel group subjected to change of the exposure time in the image display region 605, the pixel group is selected. Thereafter, when the user touches (clicks) the Setting button 607 and then the Shutter Speed button 609, exposure time setting buttons (described below) are displayed.

Figure 7:
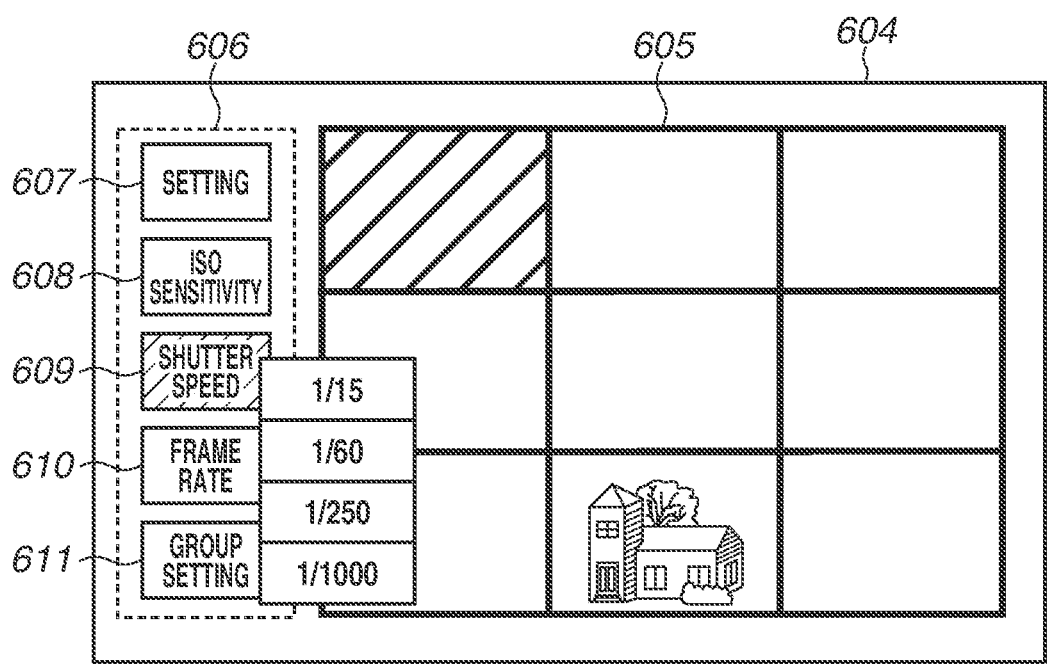
FIG. 7 illustrates an example of a screen displayed on the display apparatus according to the first exemplary embodiment.

FIG. 7 illustrates an example of a display screen after the user presses the Shutter Speed button 609. When a list of shutter speeds is displayed next to the Shutter Speed button 609, the user touches any shutter speed in the list to set the exposure time for the pixel group.

FIG. 8 illustrates an example of a flowchart illustrating the operation of the imaging apparatus according to the present exemplary embodiment. When the imaging unit 201 captures an image, the CPU 204 temporarily loads a program stored in the ROM 206 into the RAM 205 and then reads each line of the program stored in the RAM 205 to start the operation.

In step S801, the CPU 204 acquires information about a display region (specific region) of the display apparatus 104 from the client apparatus 103 via the network 102. The display region is the region of the image displayed in the image display region 605, and refers to the whole or a part of the image captured by the imaging unit 201. The display region changes by various types of operations, such as an electronic zoom operation by the user. By acquiring coordinate information for the display region in the captured image and information about the display region such as the aspect ratio of the display region, the acquisition unit 401 identifies which region of the image captured by the imaging unit 201 is the display region. The acquisition unit 401 also acquires operation information input to the client apparatus 103 by the user as information about the specific region. Thus, the acquisition unit 401 may also identify the display region based on the user operation information in advance. For example, when the user instructs an electronic zoom operation for an image to the client apparatus 103, the acquisition unit 401 acquires information about the electronic zoom operation instructed by the user and then identifies the display region. The information about an electronic zoom operation is image coordinate information input to the client apparatus 103 by the user. For example, in an electronic zoom operation, the user selects a desired region (specific region) in a square shape to be zoomed in the image by performing a drag operation with a mouse or a finger on the image display region 605. In such a case, the acquisition unit 401 acquires the coordinate information for the start and end points of the drag operation (or either point and rectangular size information).

In step S802, the determination unit 402 determines the region of pixels (hereinafter referred to as a pixel region) of the imaging unit 201 corresponding to the display region based on the information about the display region acquired in step S801 or the user operation information. The coordinate information and the aspect ratio of the display region, and the user operation information are acquired by the acquisition unit 401. The determination unit 402 therefore determines the pixel region on the imaging plane of the imaging unit 201 (image sensor 201a) corresponding to the display region based on these pieces of information.

In step S803, the change unit 403 changes at least one of the number and the size of pixel groups in the pixel region determined by the determination unit 402. The change unit 403 changes the number and the size of pixel groups based on the size ratio of the display region to the imaging region of the imaging unit 201, the upper or lower limit of the number of settable blocks set by the user or designer, and an instruction for the number and the size of pixel groups from the user. For example, the change unit 403 changes the number and the size of pixel groups in the pixel region such that the number of pixel groups is smaller than the upper limit (predetermined value). The change unit 403 may determine whether to change the number of pixel groups by determining whether the size of the specific region (display region) acquired by the acquisition unit 401 is larger than the image captured by the imaging unit 201. For example, when the size of the specific region is smaller than the size of the image captured by the imaging unit 201, the change unit 403 changes at least one of the number, the size, and the shape of pixel groups. The region subjected to change of the number and the size of pixel groups is not limited to the pixel region determined by the determination unit 402. Thus, the change unit 403 can suitably change the number and the size of pixel groups in the pixel region other than the pixel region determined by the determination unit 402 based on the above-described information. More specifically, the number and the size of pixel groups in the entire imaging plane may be suitably changed according to change of the number and the size of pixel groups in the pixel region. The already set number and the size of pixel groups do not need to be changed, or may be changed based on the number of pixel groups in the display region before the change.

In step S804, the exposure control unit 404 controls the exposure time or gain for each of the pixel groups changed by the change unit 403.

Figure 9B:
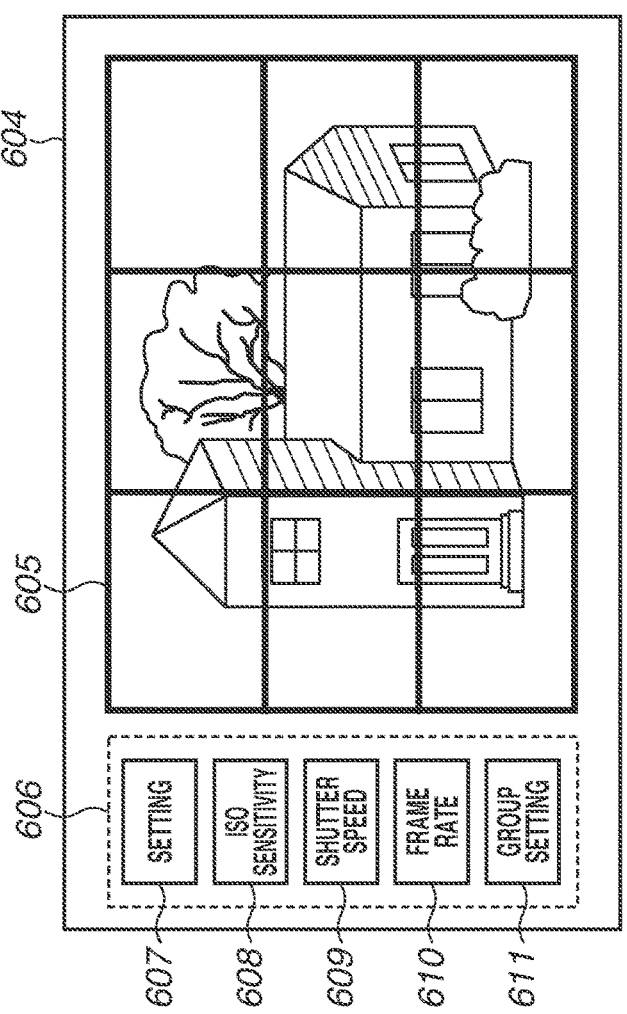
FIGS. 9A and 9B illustrate example changes of the number, the size, and the shape of pixel groups in the pixel region corresponding to a specific region on the imaging apparatus according to the first exemplary embodiment.
Figure 9A:
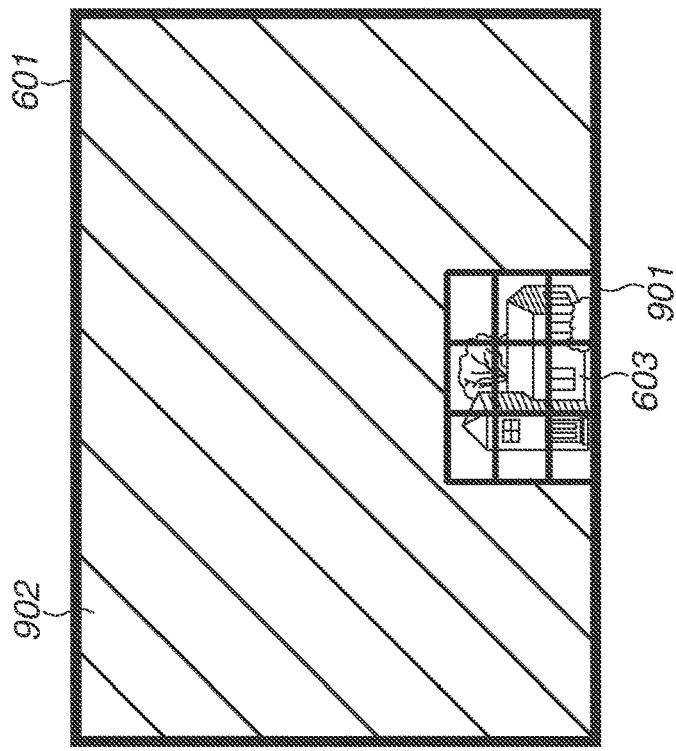

FIGS. 9A and 9B illustrate an example of an image captured when the operation of the imaging apparatus according to the present exemplary embodiment is applied and an example of a display image. FIGS. 9A and 9B illustrate results of change from FIGS. 6A and 6B, respectively, and illustrate that the upper limit of the total number of pixel groups is set to 10. FIG. 9A illustrates the entire image captured by the imaging unit 201 and the same region as the imaging region 601 in FIG. 6A. The subject 603 is also the same as the subject in FIG. 6A.

Referring to FIG. 9B, the subject 603 is displayed in the entire image display region 605, unlike FIG. 6B. In other words, a part of the image captured by the imaging unit 201 becomes the display region. This may occur in an electronic zoom operation by the user.

The acquisition unit 401 acquires the display region in FIG. 9B from the client apparatus 103 in step S801, and the determination unit 402 determines the pixel region corresponding to the display region in step S802.

Referring to FIG. 9A, the display region 901 in the imaging region 601 is displayed in the image display region 605. A non-display region 902 as the shaded region in the imaging region 601 is not displayed in the image display region 605. The grid lines in FIG. 9A indicate boundaries of pixel groups after the number and the size of pixel groups are changed by the change unit 403.

In step S803, the number and the size of pixel groups in the imaging region 601 have been changed by the change unit 403 from those in FIG. 6A. The display region 901 has nine pixel groups while the non-display region 902 has one pixel group. According to the present exemplary embodiment, the number of pixel groups in the display region 901 is changed to maintain the number of pixel groups (9 pixel groups) in the display region in FIG. 6A. In addition, since the upper limit of the number of settable pixel groups is set to 10, the number of pixel groups in the non-display region 901 is set to 1. All of the pixel groups in the display region 901 also have a uniform size. Another specific example will be described. Since the size ratio of the imaging region 601 to the display region 901 is approximately 9:1, the change unit 403 has changed the number of pixel groups in the pixel region (display region 901) determined by the determination unit 402 to 9. The size of each pixel group is a result of equally dividing the pixel region, and the shape thereof is analogous to the shape of the pixel region.

Figure 10A:
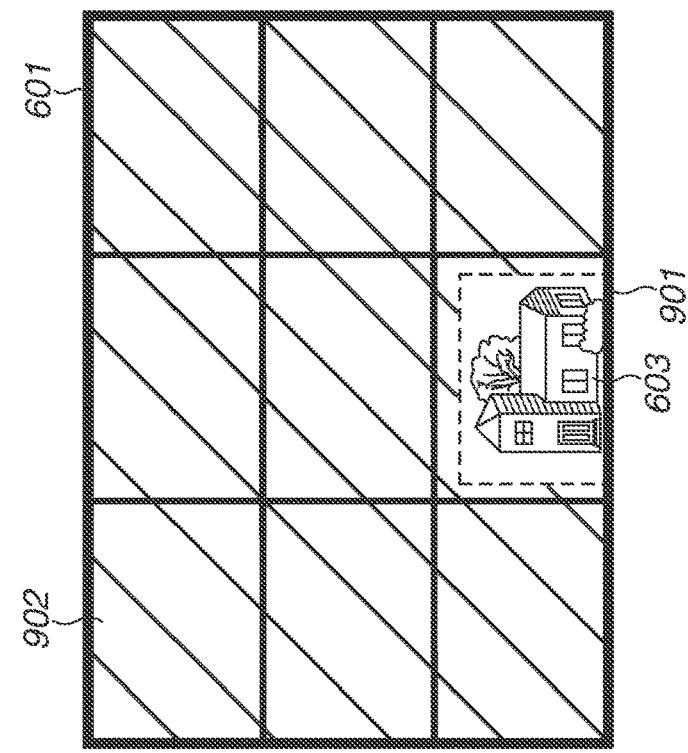
FIGS. 10A and 10B illustrate a state where the number, the size, and the shape of pixel groups in the pixel region corresponding to the specific region remain unchanged on the imaging apparatus according to the first exemplary embodiment.
Figure 10B:
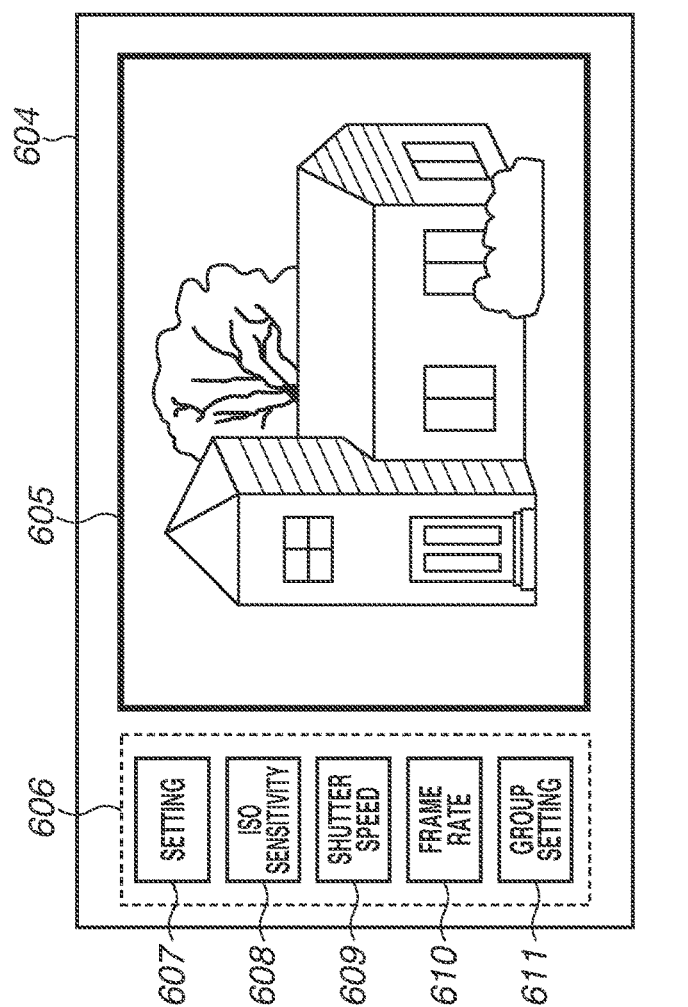

FIGS. 10A and 10B illustrate an example of an image captured when the operation of the imaging apparatus according to the present exemplary embodiment is not applied. Similarly to FIGS. 9A and 9B, FIGS. 10A and 10B illustrate results of change from FIGS. 6A and 6B, respectively. Referring to FIG. 10A, the number and the size of pixel groups in the display region 901 and the non-display region 902 remain unchanged. Thus, the numbers of pixel groups in the display region 901 and pixel groups in the non-display region 902 are different between FIGS. 9A and 10A.

When the display region 901 includes one pixel group, the exposure control unit 404 can control the same exposure time or gain for the display region 901. With a large luminance difference in the display region 901, overexposure in bright regions or underexposure in dark regions occurs, resulting in the degradation of the image visibility in the display region 901. According to the present exemplary embodiment, in contrast, the number of pixel groups in the display region 901 is changed to 9 as illustrated in FIG. 9A. Thus, the exposure control unit 404 can control different exposure time or gain for each pixel group in the display region 901. This enables image capturing by prolonging the exposure time for dark regions and shortening the exposure time for bright regions in the display region 901. The dynamic range of the display region 901 improves to enable displaying high-visibility images, accordingly.

Supplementary information for the present exemplary embodiment will be described. Referring to FIG. 9A, the change unit 403 changes the number and the size of pixel groups in the display region 901 such that the number of pixel groups coincides with that in the display region in FIG. 6A, and set the number of pixel groups in the non-display region 902 to 1 according to the upper limit of the number of settable pixel groups. Thus, the imaging region 601 includes a total of 10 pixel groups. In this case, when the upper limit of the number of pixel groups is 9, the number of exposure regions is to be fit into the upper limit of 9. Applicable methods for fitting the number of exposure regions into the upper limit include the following four methods.

The first method is a method of canceling calculations on the image processing in the non-display region 902 performed by the image processing unit 201c. Since the non-display region 902 cannot be visually recognized by the user, the increase in the data processing load can be prevented by omitting the calculations on exposure conditions performed by the image processing unit 201c. Omitting the image processing in this way enables reducing one piece of processing to be performed for each pixel group, preventing the increase in the number of pixel groups to be processed, in a pseudo way.

The second method is a method of combining one of pixel groups in the display region 901 adjacent to the non-display region 902 with a pixel group in the non-display region 902. A specific method of combining exposure regions will be described below with reference to FIGS. 11A and 11B. FIGS. 11A and 11B illustrate a state where a pixel group in the display region 901 is combined with the pixel group in the non-display region 902. The imaging region 601 in FIG. 11A covers the same imaging range as that of the imaging region 601 in FIG. 6A. In such a case, the upper right pixel group in the display region 901 is combined with the pixel group in the non-display region 902. The boundaries of combination are drawn with dotted lines. Combining the pixel groups in this way enables preventing the increase in the number of pixel groups. In such a case, the calculation range of the exposure time or gain of the combined pixel groups to the image display region 605 is limited. More specifically, to calculate the exposure time or gain of the combined pixel groups, the change unit 403 uses not image information for the non-display region 902 but image information (e.g., luminance information) corresponding to the upper right pixel group in the image display region 605. This enables setting the suitable exposure time or gain by referring to the luminance information for the image display region 605 visible from the user, without referring to the luminance of the non-display region 902. The operation for combining pixel groups is performed by the change unit 403 in step S803.

Figure 12A:
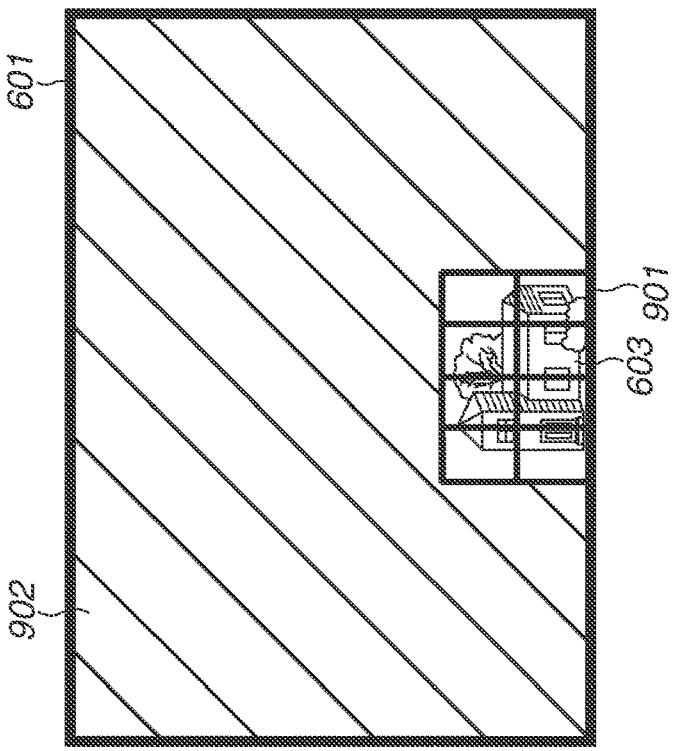
FIGS. 12A and 12B illustrate example changes of the number, the size, and the shape of pixel groups in the pixel region corresponding to the specific region based on an upper limit of the number of pixel groups in the imaging apparatus according to the first exemplary embodiment.
Figure 12B:
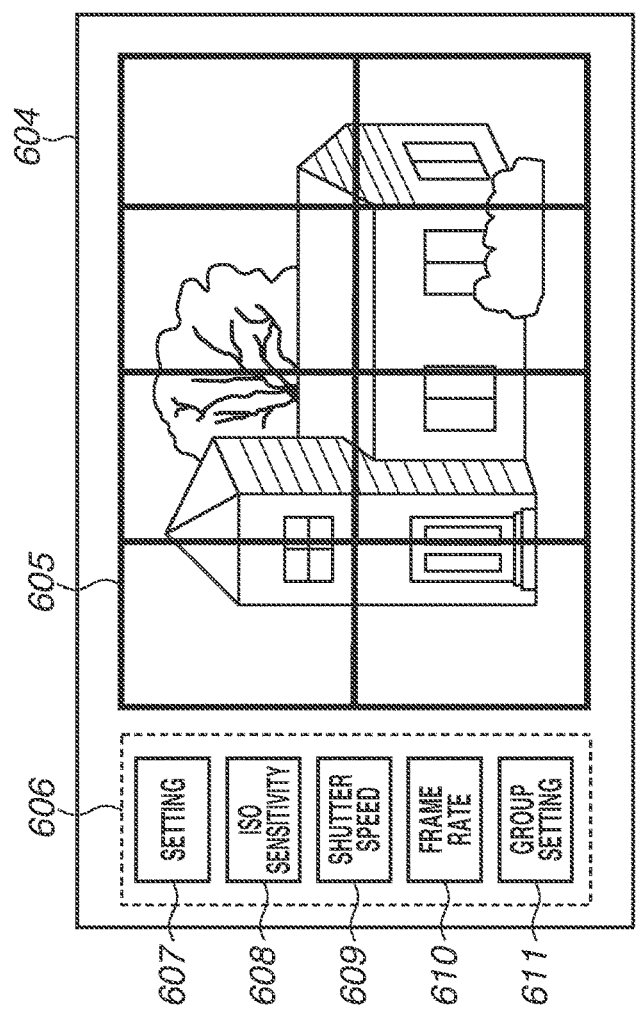

The third method is a method of equally dividing the display region 901 by the number of pixel groups subtracted from the number of pixel groups of the display region 901 by one, which is the number of pixel groups in the non-display region 902, to provide pixel groups with a uniform size. A specific method of changing the size and shape of pixel groups will now be described with reference to FIGS. 12A and 12B. FIGS. 12A and 12B illustrate a state where the number of pixel groups in the display region is decreased by the number of pixel groups in the non-display region. The imaging region 601 in FIG. 12A covers the same imaging range as the imaging region 601 in FIG. 6A. The change unit 403 changes the size of pixel groups such that the number of pixel groups in the display region 901 in FIG. 12A is 8, i.e., 9 minus 1 which is the number of pixel groups in the non-display region 902. This enables preventing the increase in the number of pixel groups even if one pixel group is assigned in the non-display region 902. FIG. 12B illustrates that the image display region 605 includes eight pixel groups. This number is less than the number of pixel groups in the image display region 605 in FIG. 6B by one. However, the number of pixel groups in the image display region 605 in FIG. 12B is larger than the number of pixel groups in the image display region 605 in FIG. 10B.

Figure 13A:
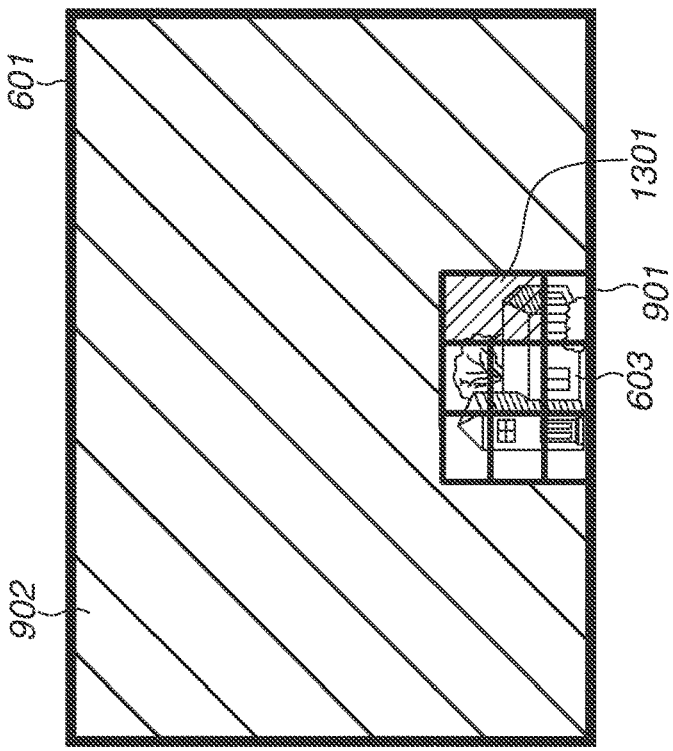
FIGS. 13A and 13B illustrate an example of a combination of pixel groups in the pixel region corresponding to the specific region in the imaging apparatus according to the first exemplary embodiment.
Figure 13B:
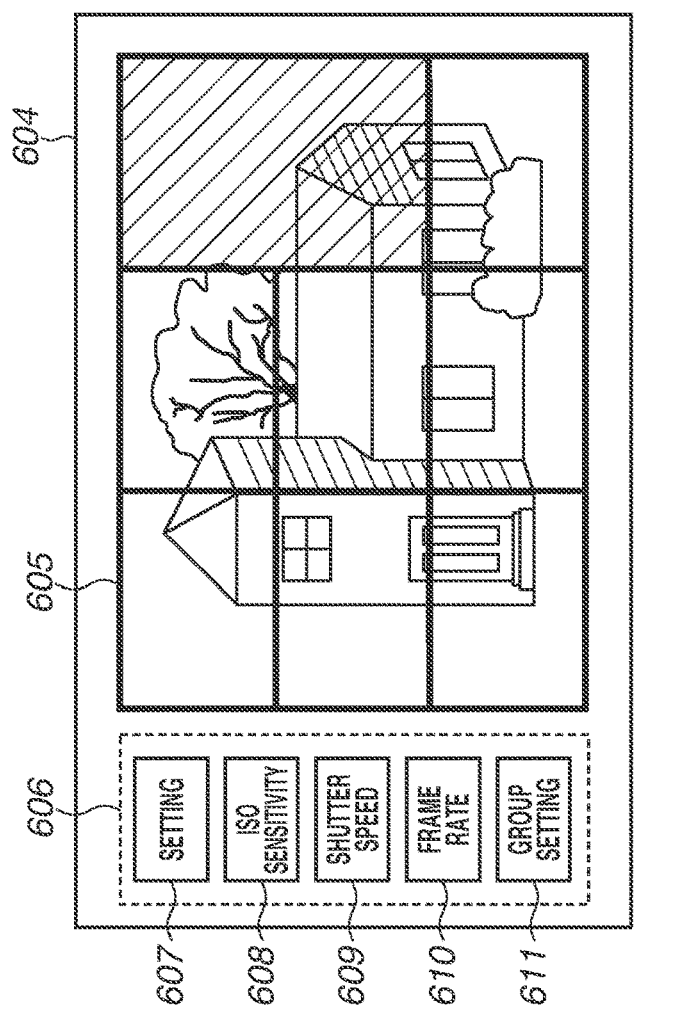

The fourth method is a method of combining adjacent pixel groups in the display region. A specific method of combining adjacent pixel groups in the display region 901 will be described with reference to FIGS. 13A and 13B. FIGS. 13A and 13B illustrate a state where adjacent pixel groups in the display region 901 are combined. The imaging region 601 in FIG. 13A covers the same imaging range as the imaging region 601 in FIG. 6A. In such a case, adjacent pixel groups in the display region 901 in FIG. 13A are combined. The combined pixel groups are shaded as a combined region 1301. This enables preventing the increase in the number of pixel groups even if one pixel group is assigned in the non-display region 902. FIG. 13B illustrates that the image display region 605 includes eight pixel groups. This number is less than the number of pixel groups in the image display region 605 in FIG. 6B by one. However, the number of pixel groups in the image display region 605 in FIG. 13B is larger than the number of pixel groups in the image display region 605 in FIG. 10B. Any pixel groups can be combined as long as the pixel groups are in the display region 901, and the operation for combining pixel groups is performed by the change unit 403 in step S803.

Although, in the above-described examples, the number of pixel groups is 9 or 10, the present exemplary embodiment is not limited thereto. The lower limit of the number of pixel groups is 2. Likewise, the upper limit of the number of pixel groups is not limited.

In one embodiment, the upper limit of the number of pixel groups is set in accordance with the frame rate or power consumption by the designer. Further, the upper limit of the number of pixel groups may be changed according to the load status in the data processing by the CPUs or the use status of the calculation region of the RAMs in the monitoring camera 101 and the client apparatus 103. In particular, the upper limit of the number of pixel groups may be set based on a table describing drive conditions (e.g., gain, frame rate, power consumption, and effective number of pixels) of the imaging unit 201 (image sensor 201a) and the upper limit of the number of pixel groups.

In one embodiment, the designer or user arbitrarily sets the number of pixel groups or a range of the number to be within a range not exceeding the upper limit of the number of pixel groups. The present exemplary embodiment has been described above centering mainly on an example case where the number of pixel groups is set to 9. In a case where the user sets the number of pixel groups or a range of the number, the user touches (clicks), for example, the Group Setting button 611 in the operation button display region 606. Then, the screen transitions to a setting screen that enables the user to set the number of pixel groups or a range of the number, or a setting button is displayed on the display apparatus 104. The user is thus able to capture an image with the desired number of pixel groups, thereby improving the visibility of the image displayed in the display region 605.

The number of pixel groups may be associated with the user operation information acquired by the acquisition unit 401. For example, the number of pixel groups may be associated with the user's electronic zoom operation information (e.g., zoom magnification and zoom position). In this case, the change unit 403 changes the number of pixel groups to increase the number of pixel groups as a zoom magnification increases. Thus, by increasing the number of pixel groups in the display region as a display region becomes small, the dynamic range improves even in a small region in the imaging region 601, thereby enabling to display high-visibility images.

The present exemplary embodiment has been described above centering on a method of changing the size of pixel groups to provide pixel groups with a uniform size in the display region. However, the pixel groups do not need to be in a uniform size. The present exemplary embodiment has also been described above centering on a case where the shape of pixel groups is a rectangle. However, the pixel groups may have a trapezoid shape or a shape according to the shape of the main subject, such as a person, animal, and building. However, since pixel groups are formed of one or more pixels on the imaging plane of the image sensor 201a, the shape of the pixel groups cannot be changed to a shape deviating from a pixel array or to a size smaller than the pixel size.

The image display region 605 has been described to be a region for displaying the image captured by the imaging unit 201. The captured image here refers to an image captured with effective pixels of the image sensor 201a. The captured image does not refer to an image captured by redundant pixels (pixels used for filtering, black level correction, or other image processing).

The present exemplary embodiment has been described above centering on a case where the display apparatus 104 has one image display region. However, the display apparatus 104 may have a plurality of image display regions. A case where the display apparatus 104 has a plurality of image display regions will be described with reference to FIGS. 14A and 14B. In particular, a case where different regions of the image captured by the monitoring camera 101 are displayed on the display apparatus 104 will be described. As to a case where images captured by a plurality of monitoring cameras are displayed on the same screen, the redundant description thereof will be omitted because of the same operation as above. The present exemplary embodiment will be described centering on a case where the image captured by the monitoring camera 101 and the image in a partial region of the captured image are displayed. FIGS. 14A and 14B are schematic views illustrating a state where a plurality of regions of an image captured by the imaging apparatus according to the present exemplary embodiment is displayed on the display apparatus 104.

The imaging region 601 in FIG. 14A covers the same imaging range as that of the imaging region 601 in FIG. 6A. A display region 1401 is a different display region from the display region 901 displayed in the display screen 604. The display region 1401 as the shaded region is the region other than the display region 901 in the imaging region 601.

FIG. 14B illustrates a state where the display screen 604 includes two image display regions. The image of the imaging region 601 is displayed in an image display region 1402, and the image of the display region 901 is displayed in an image display region 1403.

In such a case, since both the display regions 1401 and 901 are displayed in the display screen 604, the change unit 403 changes at least one of the number, the size, and the shape of pixel groups corresponding to each display region. According to the present exemplary embodiment, the change unit 403 makes changes such that the number of pixel groups corresponding to each display region maintains the number of pixel groups in FIG. 6A. Thus, the change unit 403 makes changes such that the numbers of both pixel groups corresponding to the display region 901 and pixel groups corresponding to the display region 1401 become 9.

This enables changing at least one of the number, the size, and the shape of pixel groups in the pixel region corresponding to each region even when images of a plurality of regions in the image captured by the imaging unit are displayed. Thus, all of the displayed images are high-visibility images with an improved dynamic range. The change unit 403 may change at least one of the number, the size, and the shape of pixel groups for either one of the plurality of display images. In such a case, the user's target image is selected as the target display image. For example, the user's target image is selected on the display apparatus 104, the image operated last is determined as the user's target image, and the image overlapped with the cursor is determined as the user's target image.

The present exemplary embodiment has been described above centering on a case where each pixel region includes nine pixel groups when displaying both the image of the entire imaging region and an enlarged image of a clipped part of the imaging region. The number, the size, and the shape of pixel groups in each pixel region, and the ratio of these values can be freely changed. For example, the ratios of the number and the size of pixel groups can be changed based on the size ratio between pixel regions.

This also applies to a case where a plurality of the client apparatuses 103 is connected to the network 102. The acquisition unit 401 acquires the region of the image to be displayed on the display apparatus 104 from each client apparatus 103, and the determination unit 402 determines the pixel region corresponding to each image region. The change unit 403 changes the number, the size, and the shape of pixel groups in the pixel region.

The change unit 403 may change the number, the size, and the shape of pixel groups in the pixel region corresponding to a region not displayed on the display apparatus 104. For example, when the recording mode of the client apparatus is ON, the change unit 403 changes the number, the size, and the shape of pixel groups even in the pixel region corresponding to the region not displayed on the display apparatus 104. In such a case, the acquisition unit 401 acquires information about the ON/OFF state of the recording mode of the client apparatus 103 in step S801. When the recording mode is ON in step S803, the change unit 403 changes at least one of the number, the size, and the shape of pixel groups in the pixel region corresponding to the non-display region 902. This enables displaying high-visibility images with an improved dynamic range even when displaying a recorded image after recording the image of a region not displayed on the display apparatus 104.

The present exemplary embodiment has been described above centering on a region displayed on the display apparatus 104 as an example of a specific region. Other examples of a specific region include a face recognition region and a human body recognition region. For example, when the client apparatus 103 performs face recognition or human body recognition, the acquisition unit 401 acquires information about the region subjected to face recognition (face recognition region) or the region subjected to human body recognition (human body recognition region) as a specific region. Then, the change unit 403 changes at least one of the number, the size, and the shape of pixel groups in the pixel region corresponding to the face recognition region or the human body recognition region. This improves the dynamic range of an image in the face recognition region or the human body recognition region to provide high-visibility images, resulting in an improved recognition accuracy of the client apparatus 103.

A second exemplary embodiment will now be described centering on a case where display images are subjected to superimposition display represented by Picture In Picture (PIP). In particular, the present exemplary embodiment will be described centering on a case where the image captured by the monitoring camera 101 is superimposed with the image in a partial region of the captured image. The apparatus configuration and the functional configuration of the imaging apparatus and the information processing apparatus (client apparatus) according to the present exemplary embodiment are the same as those according to the first exemplary embodiment, and thereby redundant descriptions thereof will be omitted.

The imaging apparatus according to the present exemplary embodiment differs from that according to the first exemplary embodiment in that pixel groups in a region subjected to the superimposition with the image in a specific region are combined with the region other than the specific region.

Figure 15A:
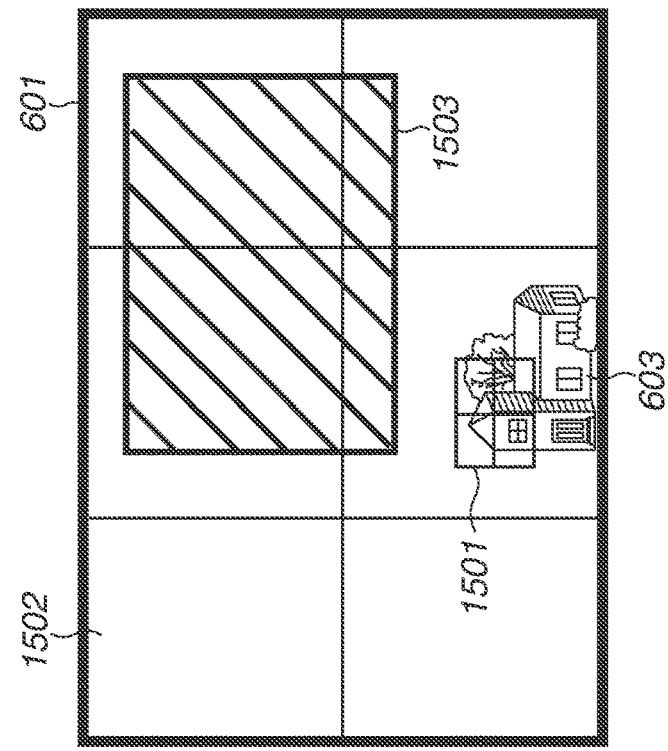
FIGS. 15A and 15B illustrate an example of an image captured by an imaging apparatus and an example of a display screen of a display apparatus (input apparatus) according to a second exemplary embodiment.
Figure 15B:
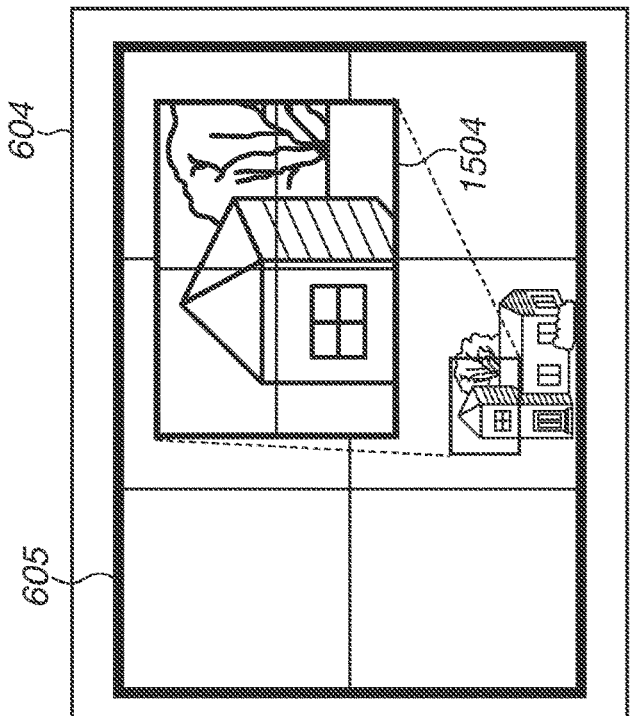

A method of changing pixel groups when display images are superimposed (PIP) will now be described with reference to FIGS. 15A and 15B. FIGS. 15A and 15B illustrate a display region for PIP and pixel groups in the display region.

FIG. 15A covers the same imaging range as that illustrated in FIG. 6A. A selected region 1501 as a partial region of the subject 603 is specified by the user through a drag operation in the image display region 605. In contrast, a non-selected region 1502 is the region not selected by the user. A superimposition region 1503 as the shaded region is a region for displaying the image in the selected region 1501 enlarged through electronic zoom processing.

As illustrated in FIG. 15B, the image display region 605 displays a PIP display image 1504 as the image in the selected region 1501 enlarged in the superimposition region 1503.

A method of changing pixel groups in the pixel regions corresponding to the selected region 1501, the non-selected region 1502, and the superimposition region 1503 will be described below. The following descriptions will be made on the premise that the upper limit of the number of pixel groups is 10. Since the operation of the imaging apparatus according to the present exemplary embodiment is similar to that according to the first exemplary embodiment, the operation in each step in FIG. 8 according to the present exemplary embodiment will be described. Step S804 is the same as that according to the first exemplary embodiment, and thus the redundant description thereof will be omitted.

In step S801, the acquisition unit 401 acquires the information about the specific region. As the information about the specific region, the acquisition unit 401 acquires information about the selected region 1501, the non-selected region 1502, and the superimposition region 1503. The selected region 1501 and the superimposition region 1503 are determined when the user selects each region by performing a drag operation in the image display region 605. Thus, the acquisition unit 401 acquires the operation information input to the client apparatus 103 by the user. More specifically, the acquisition unit 401 acquires the coordinates and the sizes of the selected region 1501 and the superimposition region 1503 set by user operations. The present exemplary embodiment will be described below centering on a case where the user sets the selected region 1501 and the superimposition region 1503, but the user may select the selected region 1501. In such a case, when the display control unit 504 selects, as the superimposition region 1503, a region not to be superimposed with the selected region 1501, the information about the superimposition region 1503 is set. Thus, the acquisition unit 401 acquires the selected region 1501 set by the user and the superimposition region 1503 set by the display control unit 504. Since the non-selected region 1502 is the region other than the selected region 1501, the non-selected region 1502 is uniquely determined by the information about the selected region 1501. Thus, the acquisition unit 401 acquires the information about the non-selected region 1502 by determining the non-selected region 1502 based on the information about the selected region 1501.

In step S802, the determination unit 402 determines the pixel region corresponding to the specific region. According to the present exemplary embodiment, the determination unit 402 determines the pixel regions corresponding to the selected region 1501, the non-selected region 1502, and the superimposition region 1503.

In step S803, the change unit 403 changes at least one of the number, the size, and the shape of pixel groups in the determined pixel region. According to the present exemplary embodiment, the upper limit of the number of pixel groups is set to 9, and thus the change unit 403 changes the at least one of the number, the size, and the shape of pixel groups such that the total number of pixel groups for each pixel region is smaller than or equal to the upper limit value. In such a case, the at least one of the number, the size, and the shape of pixel groups are determined such that the ratio of the number of pixel groups in the pixel region corresponding to the selected region 1501 to the number of pixel groups in the pixel region corresponding to the non-selected region 1502 becomes 4:6. The change unit 403 changes the at least one of the number, the size, and the shape of pixel groups such that the size and the shape of pixel groups are identical in each pixel region. The pixel groups in the pixel region corresponding to the superimposition region 1503 are combined with the pixel groups in the non-selected region 1502.

The image display region 605 includes all of the PIP display image 1504 that is enlarged, and the non-selected region 1502 and the selected region 1501 that are not enlarged. Changing at least one of the number, the size, and the shape of pixel groups in each region enables displaying an image with an improved dynamic range and high recognition accuracy.

The present exemplary embodiment acquires the region of the superimposition region 1503 and does not subject an image captured by the pixel groups in the superimposed region to image processing, thereby making it possible to restrict the load on the CPU 204 in the monitoring camera 101 and the amount of memory to be used in calculations.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-152318, filed Sep. 17, 2021, which is hereby incorporated by reference herein in its entirety.

What is claimed is:
1. An apparatus comprising:
   an image sensor that captures a subject through an optical system, wherein the image sensor can set an exposure time or gain for each of pixel groups individually;
   at least one processor; and a memory coupled to the at least one processor, the memory storing instructions that, when executed by the at least one processor, cause the at least one processor to:
acquire information about a specific image region in an image captured by the image sensor;
determine a specific pixel region corresponding to the specific image region, based on the information about the specific image region;
change at least one of a number, a size, and a shape of pixel groups in the determined specific pixel region so that the number of pixel groups becomes smaller than a predetermined value; and
control the exposure time or gain for each of the changed pixel groups individually.

2. The apparatus according to claim 1, wherein, in a case where a size of the specific image region is smaller than a size of the generated image, at least one of the number, the size, and the shape of pixel groups in the specific pixel region is changed.

3. The apparatus according to claim 1, wherein at least one pixel group in the specific pixel region and at least one pixel group in the pixel region other than the specific pixel region are combined as one pixel group.

4. The apparatus according to claim 3, wherein an exposure time or gain of the combined pixel group is controlled, based on the specific image region in the image captured by the image sensor.

5. The apparatus according to claim 1, wherein the number of pixel groups is changed such that a sum of the number of pixel groups in the specific pixel region and a number of pixel groups in a pixel region other than the specific pixel region is smaller than or equal to a predetermined upper limit value.

6. The apparatus according to claim 1, wherein, based on a ratio of a size of the image captured by the image sensor to a size of the specific image region, a ratio of the number of pixel groups in the specific pixel region to a number of pixel groups in a pixel region other than the specific pixel region is changed.

7. The apparatus according to claim 1, wherein the specific image region is a region to be displayed in a display device out of the image captured by the image sensor.

8. The apparatus according to claim 7, further comprising the display device.

9. The apparatus according to any one of claim 1,
wherein the instructions further cause the at least one processor to communicate with an information processing apparatus for subjecting the image captured by the image sensor to face recognition or human body recognition, and
wherein the specific image region is a region where the face recognition or the human body recognition is performed in the image captured by the image sensor.

10. A method of controlling an apparatus including an image sensor capable of setting an exposure time or gain for each of pixel groups individually, the method comprising:
capturing a subject through an optical system;
acquiring information about a specific image region in an image captured by the image sensor;
determining a specific pixel region corresponding to the specific image region, based on the information about the specific image region;
changing at least one of a number, a size, and a shape of pixel groups in the determined specific pixel region so that the number of pixel groups becomes smaller than a predetermined value; and
controlling the exposure time or gain for each of the changed pixel groups individually.

11. The method of controlling an apparatus according to claim 10, wherein, in a case where the size of the specific image region is smaller than a size of the image captured by the image sensor, the method further comprising changing at least one of the number, the size, and the shape of pixel groups in the specific pixel region.

12. The method of controlling an apparatus according to claim 10, wherein, in a case where the number of pixel groups is larger than a predetermined value, the method further comprising combining at least one pixel group in the specific pixel region and at least one pixel group in a pixel region other than the specific pixel region.

13. The method of controlling an apparatus according to claim 10, wherein, based on a size ratio of the image captured by image sensor to the specific image region, the method further comprising changing a ratio of the number of pixel groups in the specific pixel region to the number of pixel groups in a pixel region other than the specific pixel region.

14. The method of controlling an apparatus according to claim 10, wherein the specific image region is an image region to be displayed in a display device out of the image captured by image sensor.

15. The method of controlling an apparatus according to claim 10,
wherein the specific image region is a region where an electronic zoom operation is performed in the image captured by image sensor, and
wherein at least one of the number, the size, and the shape of pixel groups in the specific pixel region is changed in a case where the electronic zoom operation is instructed.

16. The method of controlling an apparatus according to claim 10, wherein the information about the specific image region is a region subjected to face recognition or human body recognition in the image captured by image sensor.

17. An apparatus comprising:
an image sensor that captures a subject through an optical system, wherein the image sensor can set an exposure time or gain for each of a plurality of pixel groups individually;
at last one processor; and
a memory coupled to the at least one processor, the memory storing instructions that, when executed by the at least one processor, cause the at least one processor to:
acquire information about a specific image region in an image captured by the image sensor;
determine a specific pixel region corresponding to the specific image region, based on the information about the specific image region; and
control the exposure time or gain for each of the changed pixel groups individually,
wherein the specific image region is a region where an electronic zoom operation is performed in the image captured by the image sensor, and
wherein at least one of the number, the size, and the shape of pixel groups in the specific pixel region is changed in a case where the electronic zoom operation is instructed.

18. A non-transitory computer-readable storage medium storing a program for causing a computer to execute a method of controlling an apparatus including an image sensor capable of setting an exposure time or gain for each of pixel groups individually, the method comprising:

capturing a subject through an optical system;
acquiring information about a specific image region in an image captured by the image sensor;
determining a specific pixel region corresponding to the specific image region, based on the information about the specific image region;
changing at least one of a number, a size, and a shape of pixel groups in the determined specific pixel region so that the number of pixel groups becomes smaller than a predetermined value; and
controlling the exposure time or gain for each of the changed pixel groups individually.

* * * * *